United States Patent
Cayer (10) Patent No.: US 9,678,355 B2
(45) Date of Patent: Jun. 13, 2017

(54) OPTICAL DEVICE, SYSTEM AND METHODS FOR INTERROGATING A VOLUME WITH AN ILLUMINATION PATTERN

(71) Applicant: OSELA INC., Montreal (CA)

(72) Inventor: Francis Cayer, Saint-Eustache (CA)

(73) Assignee: Osela Inc., Montreal, QC ( * ) Notice: Subject to any disclaimer, the term of this patent is extended or adjusted under 35 U.S.C. 154(b) by 36 days.

(21) Appl. No.: 14/716,391

(22) Filed: May 19, 2015

(65) Prior Publication Data

US 2015/0338676 A1    Nov. 26, 2015

Related U.S. Application Data (60) Provisional application No. 62/001,442, filed on May 21, 2014.

(51) Int. Cl.
| | | |
|---|---|---|
| *G02B 27/42* | (2006.01) | |
| *G02B 27/46* | (2006.01) | |
| *G01B 11/25* | (2006.01) | |

(52) U.S. Cl.
CPC ........ *G02B 27/425* (2013.01); *G01B 11/2513* (2013.01); *G02B 27/46* (2013.01)

(58) Field of Classification Search
CPC .................................................. G02B 27/425
See application file for complete search history.

(56) References Cited

U.S. PATENT DOCUMENTS

| | | | |
|---|---|---|---|
| 8,384,997 B2 | 2/2013 | Shpunt et al. | |
| 8,630,039 B2 | 1/2014 | Shpunt | |
| 2009/0185274 A1* | 7/2009 | Shpunt | G02B 27/0944 359/558 |
| 2010/0284082 A1* | 11/2010 | Shpunt | G01B 11/25 359/558 |
| 2012/0105855 A1* | 5/2012 | Miyasaka | G01B 11/25 356/445 |
| 2014/0152839 A1* | 6/2014 | Menon | H04N 5/332 348/164 |

* cited by examiner

*Primary Examiner* — Tarifur Chowdhury
*Assistant Examiner* — Omar Nixon
(74) *Attorney, Agent, or Firm* — Norton Rose Fulbright Canada LLP; Alexandre Daoust

(57) ABSTRACT

In one embodiment, the optical device for generating an illumination pattern has a beam splitter and a pattern generator mounted in series and optically coupled one with the other. The beam splitter and the pattern generator are configured to cooperate one with the other in formatting an incident light beam into the illumination pattern. The illumination pattern has a plurality of diffraction patterns each resulting from a corresponding portion of the incident light beam being split from other portions of the incident light beam by the beam splitter. Each diffraction pattern has a zero-order beam. Each diffraction pattern overlaps with at least one of the other diffraction patterns and forms at least one overlapping region therewith, wherein the plurality of zero-order beams of the plurality of diffraction patterns are separated from one another in the illumination pattern.

21 Claims, 6 Drawing Sheets

OPTICAL DEVICE, SYSTEM AND METHODS FOR INTERROGATING A VOLUME WITH AN ILLUMINATION PATTERN

FIELD

The improvements generally relate to the field of interrogating and/or mapping a volume of space, more particularly mapping a volume of space with an illumination pattern.

BACKGROUND

Optical devices for interrogating a volume with an illumination pattern in order to obtain a mapping of the volume is known in the art per se. To achieve such an illumination pattern, it was known to use a diffractive optical element (DOE) for imparting a diffraction pattern to an incident light beam to generate the illumination pattern. However, when imparting the diffraction pattern, the DOE generally lets a zero order beam (or undiffracted beam) pass therethrough. The zero order beam can be undesired in some applications, as it can cause dynamic range issues or eye health issues, for instance.

Some optical devices for interrogating a volume with an illumination pattern include DOEs configured to provide a tiled illumination pattern by splitting and deviating the incident light beam into a plurality of adjacent diffraction patterns each having a divided zero order beam. Since each one of the partial zero order beam has a lesser power than the original zero power beam, and given their separation from one another, the optical device can be made in a manner that the zero order beam intensity is limited while retaining satisfactory power.

Still, manufacturing DOEs which can provide a tiled illumination pattern is somewhat complex since each of the diffraction pattern of the illumination pattern have to be substantially deviated one from the other in order to tile the volume with the plurality of adjacent diffraction patterns.

Although the existing techniques were satisfactory to a certain degree, there remained room for improvement, particularly in terms of reducing the complexity of manufacturing such DOEs and thus reducing the cost associated with the manufacture of such DOEs.

SUMMARY

There is provided an optical device for interrogating a volume with an illumination pattern using diffractive optical elements (DOEs) which can provide an illumination pattern comprising a plurality of overlapping diffraction patterns. While allowing to separate a zero order beam into a plurality of partial zero order beams, each having a limited intensity, the overlapping diffraction patterns require DOEs which are simpler to design and to manufacture.

In accordance with one aspect, there is provided an optical device for generating an illumination pattern, the optical device comprising: a beam splitter and a pattern generator mounted in series and optically coupled one with the other, the beam splitter and the pattern generator configured to cooperate one with the other in formatting an incident light beam into the illumination pattern, the illumination pattern having a plurality of diffraction patterns each resulting from a corresponding portion of the incident light beam being split from other portions of the incident light beam by the beam splitter, each diffraction pattern having a zero-order beam and each diffraction pattern overlapping with at least one of the other diffraction patterns and forming at least one overlapping region therewith, wherein the plurality of zero-order beams of the plurality of diffraction patterns are separated from one another in the illumination pattern.

In accordance with another aspect, there is provided an optical system for interrogating a volume with an illumination pattern, the optical system comprising: a housing; a light beam generator mounted on the housing for generating a light beam along an optical path thereof; a beam splitter and a pattern generator mounted in series and optically coupled one with the other, the beam splitter and the pattern generator configured to cooperate one with the other in formatting an incident light beam into an illumination pattern, the illumination pattern comprising a plurality of diffraction patterns each resulting from a corresponding portion of the incident light beam being split from other portions of the incident light beam by the beam splitter, each diffraction pattern having a zero-order beam, each diffraction pattern overlapping with at least one of the other diffraction patterns and forming at least one overlapping region therewith; wherein the plurality of zero-order beams of the plurality of diffraction patterns are separated from one another in the illumination pattern; an illumination pattern sensor mounted to the frame and configured to sense the illumination pattern on the volume; and a processor in communication with the illumination pattern sensor and configured to process the detected illumination pattern to obtain a mapping of the volume.

In accordance with another aspect, there is provided a method for interrogating a volume with an illumination pattern, the method comprising the steps of: providing an incident light beam along an optical path; splitting the incident light beam along the optical path to obtain a plurality of partial light beams; imparting a diffraction pattern to each one of the partial light beams to form an illumination pattern comprising a plurality of diffraction patterns each having one of a plurality of zero-order beams; orienting each one of the diffraction patterns to overlap with at least one of the other diffraction patterns forming at least one overlapping region, the zero-order beams of the plurality of diffraction patterns being spaced one from the other; and interrogating the volume with the illumination pattern.

In accordance with another aspect, there is provided an optical device for generating an illumination pattern, the optical device comprising: a beam splitter and a pattern generator mounted in series and optically coupled one with the other, the beam splitter and the pattern generator configured to cooperate one with the other in formatting an incident light beam into the illumination pattern having a plurality of diffraction patterns each having one of a plurality of zero-order beams, each of the plurality of diffraction patterns overlapping with at least one of the other diffraction patterns forming at least one overlapping region, wherein the plurality of zero-order beams of the plurality of diffraction patterns are separated from one another.

In accordance with another aspect, there is provided an optical system for interrogating a volume with an illumination pattern, the optical system comprising: a housing; a light beam generator mounted on the housing for generating a light beam along an optical path thereof; a beam splitter and a pattern generator mounted in series and optically coupled one with the other, the beam splitter and the pattern generator configured to cooperate one with the other in formatting an incident light beam into an illumination pattern comprising a plurality of diffraction patterns each having one of a plurality of zero-order beams, each of the plurality of diffraction patterns overlapping with at least one of the other diffraction patterns forming at least one overlapping region; wherein the plurality of zero-order beams of the plurality of diffraction patterns are separated from one another; an illumination pattern sensor mounted to the frame and configured to sense the illumination pattern on the volume; and a processor in communication with the illumination pattern sensor and configured to process the detected illumination pattern to obtain a mapping of the volume.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
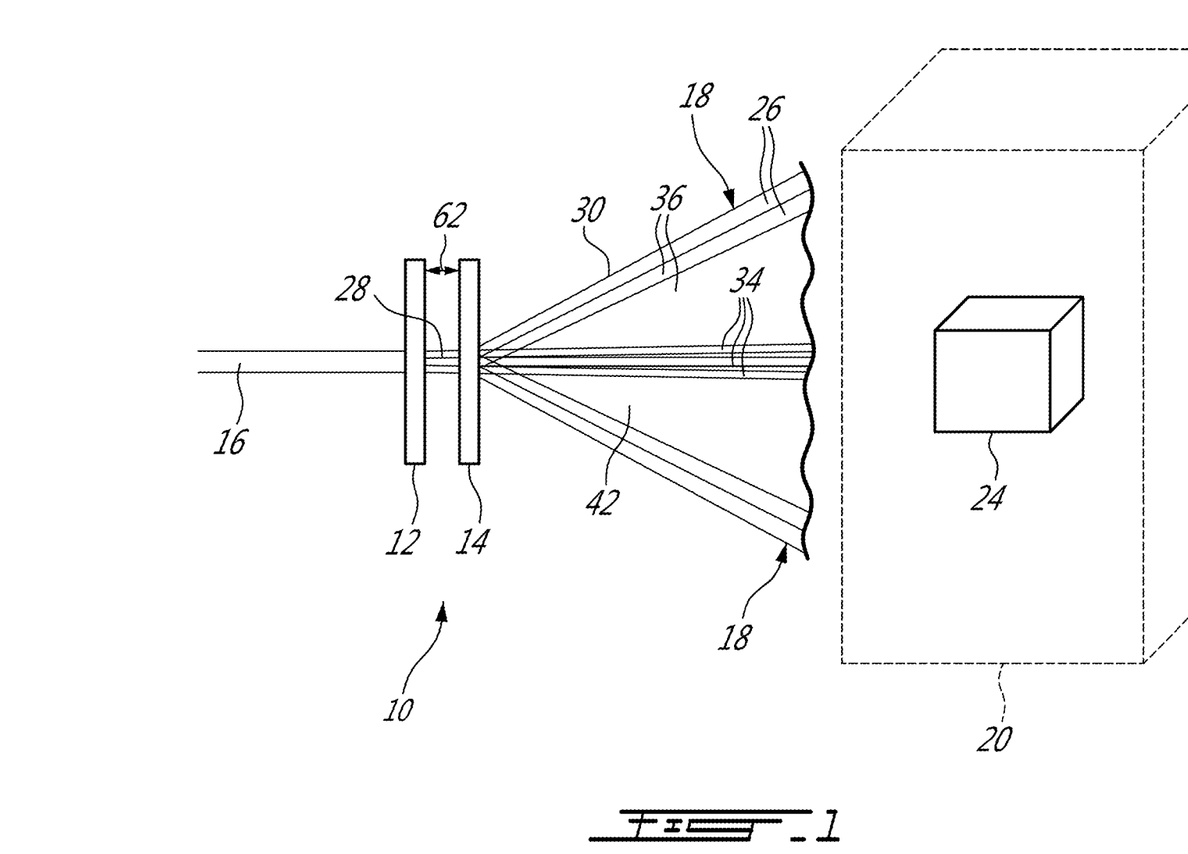
FIG. 1 is a schematic view showing an example of an optical device.

FIG. 1 shows an example of an optical device 10. It can be seen that the optical device 10 has a beam splitter 12 and a pattern generator 14 which are optically coupled to one another. Specifically, the beam splitter 12 and the pattern generator 14 are configured to receive an incident light beam 16 and cooperate one with the other to format the incident light beam 16 into an illumination pattern 18 used for interrogating a volume of space 20 (typically, more specifically an object 24 which lies in the volume of space 20) with a multitude of light spots 22 (shown at FIG. 3B). Accordingly, since surfaces of the object can impart a specific signature to the reflection of the illumination pattern 18 thereon, the reflected illumination pattern can be used to image the object in two-dimensions (2D) or in three-dimensions (3D) as described herebelow at FIG. 4.

The illumination pattern 18 formatted by both the beam splitter 12 and the pattern generator 14 comprises a plurality of overlapping diffraction patterns 26. More specifically, the beam splitter 12 can split the light beam 16 into a plurality of partial light beams 28 whereas the pattern generator 14 can impart a diffraction pattern 30 to each of the partial light beams 28. The resulting illumination pattern 18 thus comprises the plurality of overlapping diffraction patterns 26.

It is readily understood that in another embodiment, an alternate sequence (not shown) of the beam splitter 12 and the pattern generator 14 can be inverted. In this sense, the pattern generator 14 can first impart a diffraction pattern 30 to the incident light beam 16 whereas the beam splitter 12 can then split the light beam having the diffraction pattern 30 into a plurality of partial light beams 28 also having the diffraction pattern 30. The resulting illumination pattern 18 also comprises the plurality of overlapping diffraction patterns 26. Notwithstanding which of the beam splitter 12 or the pattern generator 14 first interact with the incident light beam 16, the two elements 12, 14 can be designed and manufactured specifically for the sequence shown in FIG. 2, or for the alternate sequence.

The beam splitter 12 and the pattern generator 14 can be diffractive optical elements (DOEs). As known in the art, many techniques can be used to design or to manufacture such elements. For instance, based on a desired diffraction pattern, one may use an Iterative Fourier Transform Algorithm (IFTA) to properly design either one of the two DOEs. When such a diffraction design is obtained, one may manufacture the DOEs by any suitable mask deposition or etching techniques which can provide a substrate such as a glass slide with the diffraction design, for instance.

When using DOEs, a multitude of order of diffraction are generated upon a corresponding multitude of angles or solid angles. Typically, the zero order of diffraction corresponds to a beam having the same direction of the incident light beam 16 and which is undiffracted by the DOE. Depending on the application, the zero order beam can be useful although it is generally unwanted in imaging applications. In cases where humans or animals are likely to be present in the interrogation volume 20, the zero order beam is likely to be the greatest threat for the eye in the projected image. In fact, it is typical for a ~5% value of the power of the incident light beam 16 to remain in the zero order beam. The consideration of making the zero order beam eye-safe (e.g. achieving compliance with ANSI standard IEC 60825, class 1), or otherwise safer, can thus pose a design limitation on the power of the light source used, and thus pose a limitation on the intensity of interrogation. However, the power of the zero order beam may depend on the diffraction pattern 30. Indeed, it has been found readily possible to provide beam splitting DOEs which avoid transmission of the zero order beam 34. However, in the state of the art at the time of filing of this specification, for more complex DOEs, such as pattern generator 14s envisaged in some applications described herein, the presence of a significant zero order beam is considered to be unavoidable, yet limitable.

Accordingly, rather than attempt to eliminate the zero order beam entirely, an approach described herein proposes to split the incident light beam 16 into several partial light beams 28 in order to limit the power imparted to the zero order beam by the diffraction pattern 30. By distributing the power of the zero order beam to a plurality of partial zero order beams 34, satisfactory power can be provided to the illumination pattern 18 while keeping an acceptable amount of power in each the partial/divided zero order beam 34. By separating the partial zero order beams 34 sufficiently from one another in a manner that they are considered independent at the limit of the eye-safe zone (typically considered to be 100 mm), the intensity of each divided zero order beam 34 becomes the limiting factor rather than the sum of the intensity of all the zero order beams 34. For example, in the case where there is no splitting of the incident light beam 16, if the power of the incident light beam 16 is $P_{laser}$ and that the pattern generator 14 can impart 5% of $P_{laser}$ into its zero order beam 34, there is still 95% of the power in the rest of the illumination pattern 18. Though, in the case of the optical device 10, if the power of the incident laser beam 16, $P_{laser}$, is split among 9 partial light beams 34 each having a power of $P_{laser}/9$. Then, the partial zero order beams 34 would each have 5% of $P_{laser}/9$ while the rest of the illumination pattern 18 still has 95% of $P_{laser}$. Accordingly, it is possible to limit the power imparted to the zero order beam by splitting the incident beam 16 into a plurality of partial light beams 28.

Figure 2:
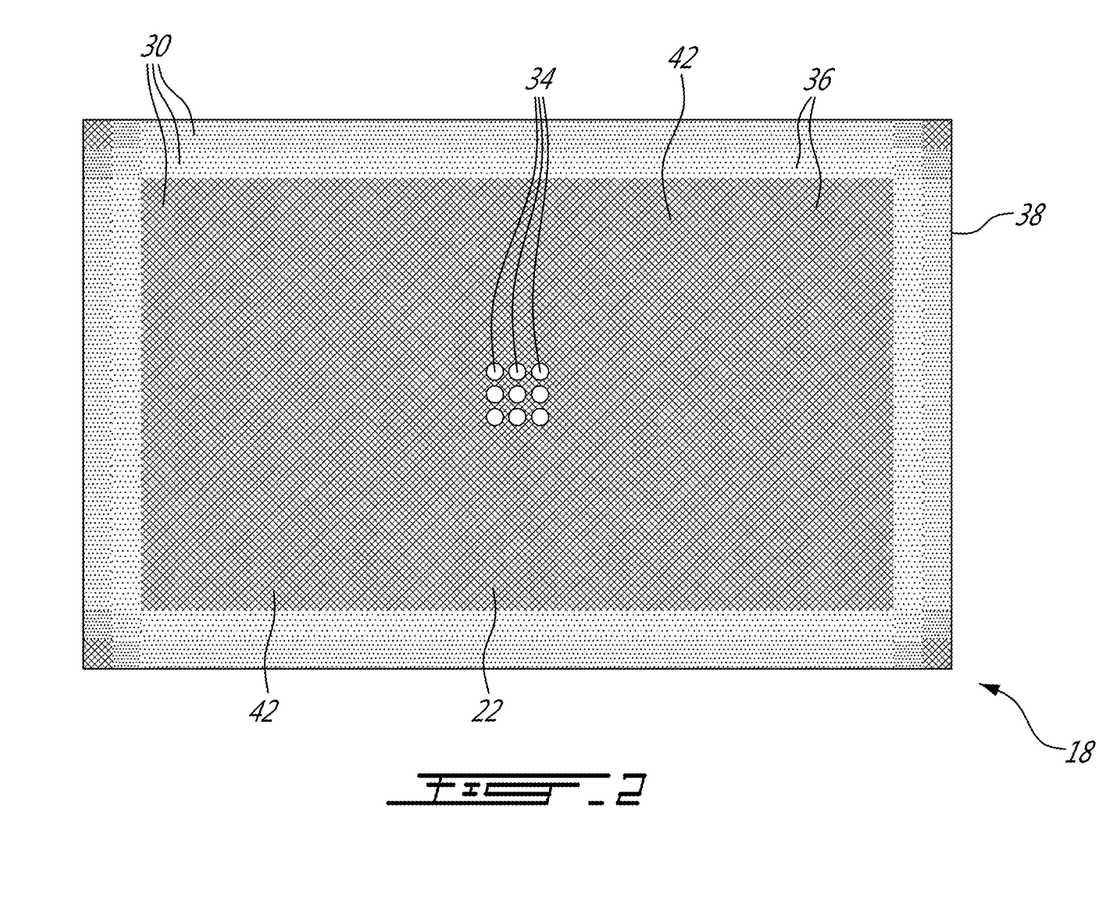
FIG. 2, is a schematic view showing a first example of an illumination pattern.

FIG. 2 shows a first example of an illumination pattern 18 as observable in a transverse plane. It was found that by providing an illumination pattern 18 having a plurality of overlapping diffraction patterns 30 can provide the advantage of splitting the power of the zero order beam into the plurality of partial zero order beams 34 while requiring simpler diffraction designs both in terms of performance and manufacturing costs, for instance. Accordingly, it was found useful to limit the angle at which each of the diffraction pattern 30 is deviated which inherently provides at least one overlapping region 36.

Still referring to FIG. 2, it can be seen that the diffraction patterns 30 overlap with one another such that, when the illumination pattern 18 is projected on a plane 38, each overlapping region 36 is smaller than the diffraction pattern 30. In the example of the illumination pattern 18 of FIG. 2, all of the plurality of partial zero order beams 34 are provided within a common overlapping region 42. Moreover, each partial zero order beam 34 associated with one of the diffraction patterns 30 of the illumination pattern 18 is centrally positioned in the corresponding diffraction pattern 30, for instance. Still, each partial zero order beam 34 can also be provided on a different overlapping region 36 in a case where the overlap between the diffraction patterns 30 is substantially reduced It is understood that the density of the light spots 22 is greater in the overlapping regions 36 than in a single diffraction pattern 30. Accordingly, as can be seen in FIG. 2, the common overlapping region 42 has a greater density of the light spots 22 than that of the other overlapping regions 36. Accordingly, to achieve a desired density of light spots 22 in the common overlapping region 42, the density of light spots of a single one of the diffraction patterns 30 can be substantially less than the desired density due to the juxtaposition of the diffraction patterns 30 at the common overlapping region 42. This can reduce the requirements of the density of light spots of the pattern generator 14, for instance.

Figure 3A:
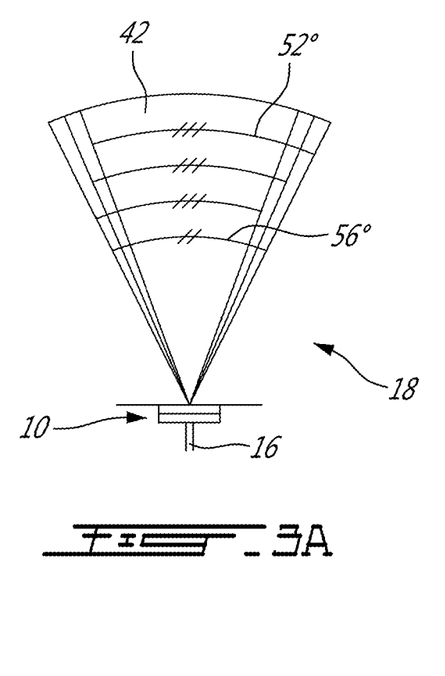
FIG. 3A is a top elevated view showing a second example of an illumination pattern.
Figure 3B:
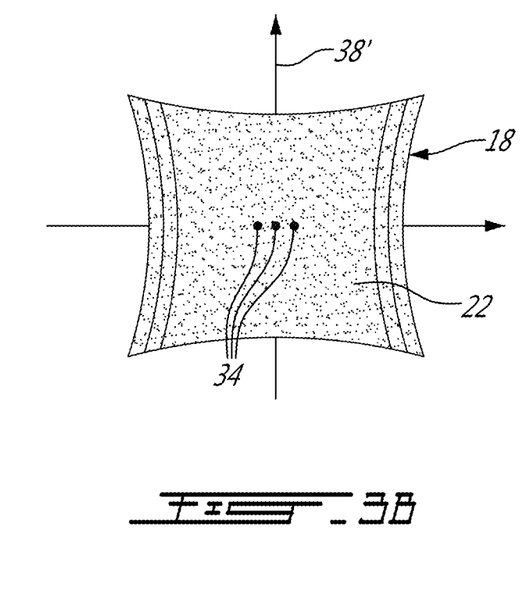
FIG. 3B is a front view projected on a plane of the second example of the illumination pattern of FIG. 3A.

FIG. 3A is a top elevated view shown a second example of an illumination pattern. In this second example, each of the three diffraction patterns 30 has an angle of approximately 52° and overlaps upon an overlapping angle of at least 48° with the other two diffraction patterns. In this example, the common overlapping pattern 42 comprises the three partial zero order beams 34 of the three diffraction patterns 30. FIG. 3B shows a front view of a plane 38' illuminated by the second example of the illumination pattern 18 of FIG. 3A. Still in this example, each of the overlapping regions has a solid angle which is non-null. Moreover, it is seen that the common overlapping region 42 has a solid angle near the given solid angle of the illumination pattern 18. Each of the overlapping regions 36 exhibits a solid angle which is non-null, and smaller than a given solid angle of the illumination pattern 18.

Figure 4:
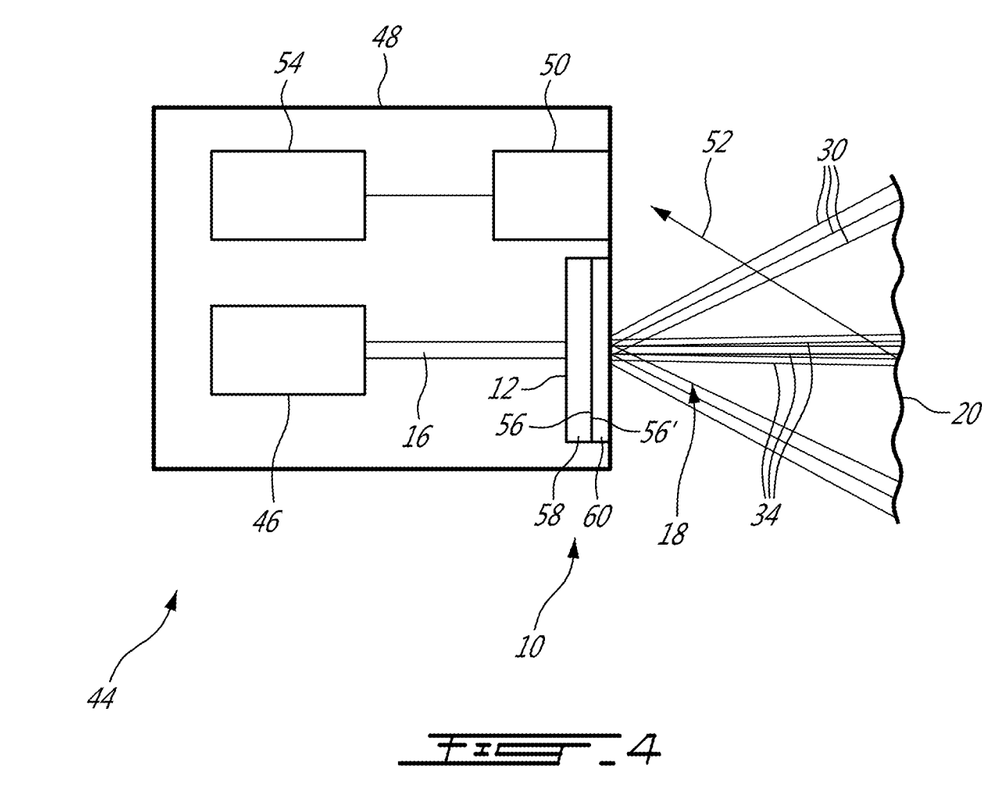
FIG. 4 is a schematic view showing an example of an optical system.

FIG. 4 is a schematic view showing an example of an optical system 44, comprising the optical device 10. The optical system 44 for interrogating the volume 20 with the illumination pattern 18 can be a standalone system. In this embodiment, the optical system 44 has a light beam generator 46 mounted to a frame 48 and providing the incident light beam 16 to the optical device 10, which is also mounted on the frame 48. Moreover, once the incident light 16 beam is formatted by the optical device 10, the frame 48 is adapted to interrogate the volume 20 with the interrogation pattern exiting from the optical device 10. To image a reflection of the illumination pattern 18, an illumination pattern sensor 50 can be provided on the frame 48. Once a reflected illumination pattern (arrow 52) is detected with the illumination pattern sensor 50 (or the combination of illumination pattern sensors in a 3D system for instance), a processor 54 can be used to process the detected illumination pattern to obtain a mapping of the volume. It is noted that the processor 54 can be either made integral to the optical system 44 or be provided separately. The processor 54 can communicate with the illumination pattern sensor 50 by a wired connection or a wireless connection.

Figure 5A:
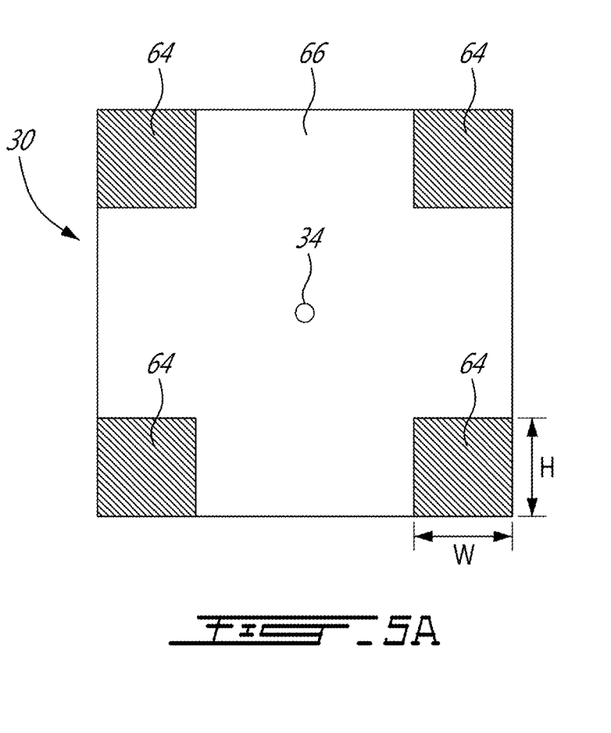
FIG. 5A is a schematic view showing an example of a diffraction pattern.

FIG. 5A is a schematic view showing an example of the diffraction pattern 30, in accordance with an embodiment. As depicted, the diffraction pattern 30 has active regions 64 and an inactive region 66. The active regions 64 includes a given pattern of light spots for interrogating the volume while the inactive region 66 has no light spots. In other words, the inactive region is empty and is not used to interrogate a volume, The pattern of light spots of the active regions 64 can be similar for all the active regions 64 of a given diffraction pattern 30 or, the pattern of light spots of the active regions 64 can differ from one active region 64 to another, in the same diffraction pattern 30, for instance. In the illustrated embodiment, the diffraction pattern 30 has a rectangular shape and each active region 64 is also rectangular. Each active region 64 has a given width W and a given height H and the active regions 64 are located at four corners of the rectangular shape of the diffraction pattern 30.

Figure 5B:
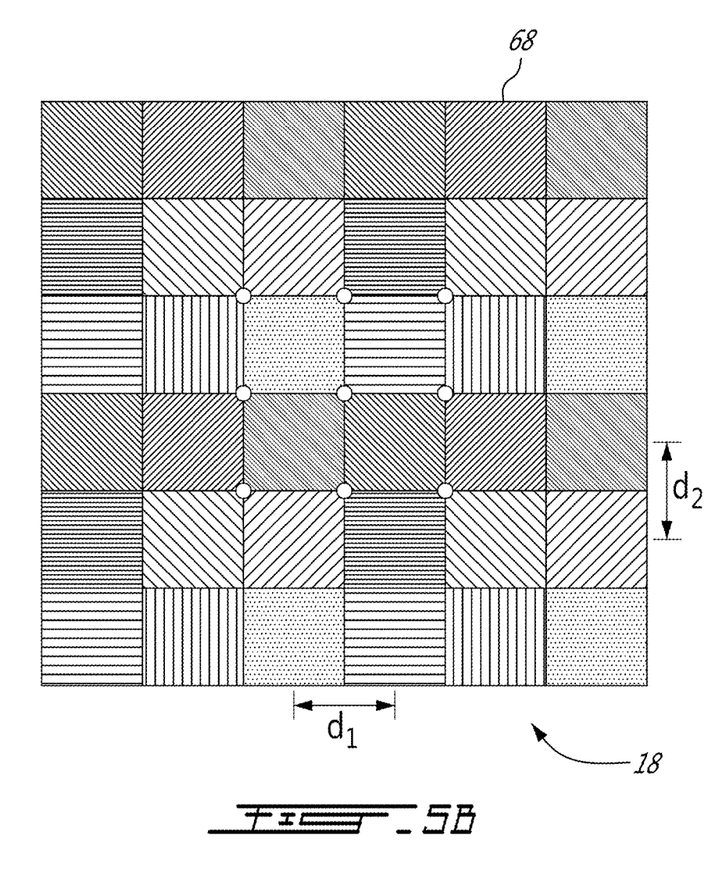
FIG. 5B is a schematic view showing a third example of an illumination pattern using the diffraction pattern of FIG. 5A.

FIG. 5B shows a third example of the illumination pattern 18, in accordance with an embodiment. As shown, the illumination pattern 18 is formed by interspersing the active regions 64 of a plurality of the diffraction patterns such as the one shown in FIG. 5A. In this specific example, nine identical diffraction patterns 30 are arranged with respect to one another in the illumination pattern 18 in a manner that each of the active regions 64 does not overlap with the other active regions 64 and that the active regions 64 collectively cover the entire area of the illumination pattern 18 to form a tessellation 68 of the active regions 64. Referring to FIG. 5B, the tessellation 68 of active regions 64 is formed by tiling each one of the active regions 64 of the nine, identical diffraction patterns 30 in the illumination pattern 18 with no overlaps and no gaps. Put differently, laterally adjacent ones of the diffraction patterns 30 are offset from one another by a distance $d_1$ corresponding to the given width W and vertically adjacent ones of the diffraction patterns 30 are offset from one another by a distance $d_2$ corresponding to the given height H to form the tessellation 68 of the active regions 64.

The tessellation 68 of the active regions 64 described above is not limited to the rectangular shape shown in FIG. 5A. Indeed, the tessellation 18 can be formed by other suitable shapes (e.g. dot matrix, triangular, hexagonal) of active regions 64 which can cover the entire area of the illumination pattern 18. For a given type of shape, the beam splitter 12 is configured to split the incident light beam accordingly. Further, the tessellation 18 can have empty spaces between the active regions 64. For instance, the active regions 64 can have a circular or an octagonal shape such that the illumination pattern has one or more than one inactive regions, i.e. regions not interrogated by the light spots. Similarly, in some alternate embodiments, some or all of the active regions can partially overlap one or more of other active regions.

Figure 6:
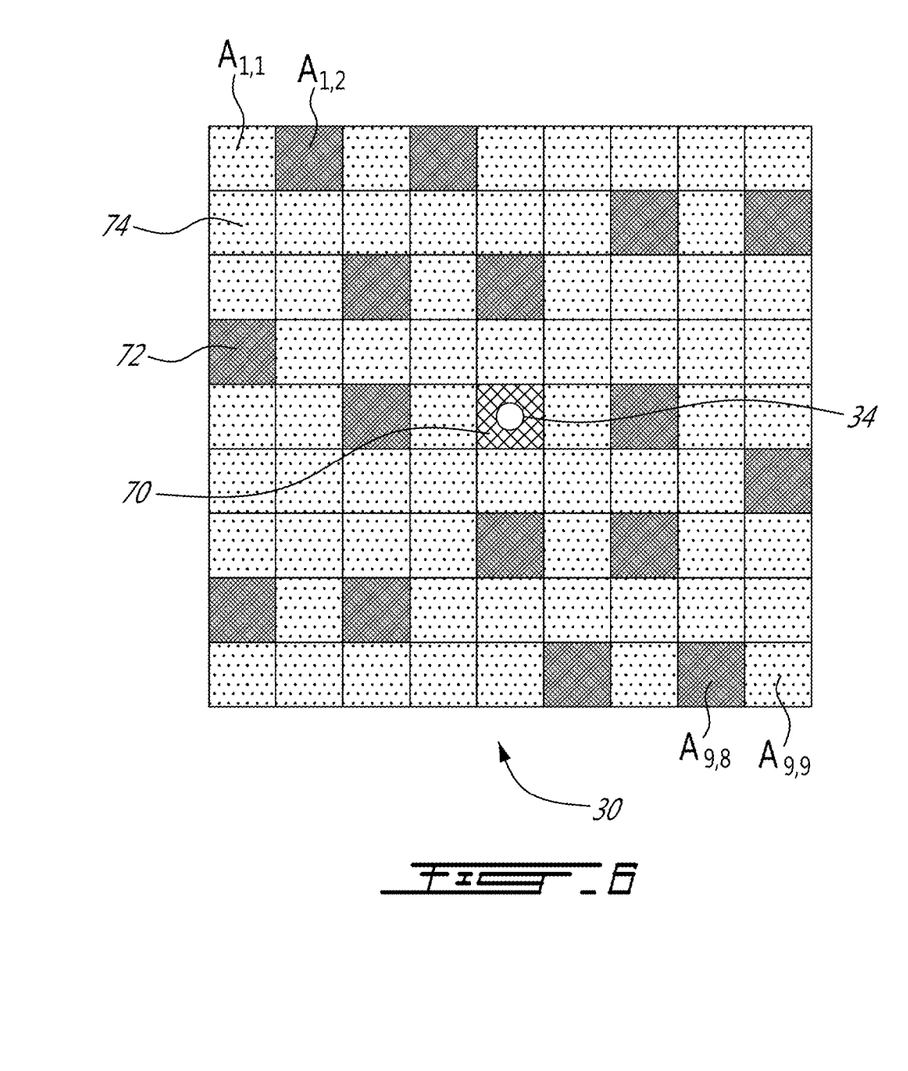
FIG. 6 is a schematic view showing an example of a diffraction pattern in the form of a randomly populated matrix of pixels.

FIG. 6 shows an example of a diffraction pattern 30 provided in the form of a randomly populated matrix A. In this example, the randomly populated matrix is provided by the pattern generator and a same diffraction pattern is repeated by the beam splitter to form a plurality of diffraction patterns arranged to form the illumination pattern. In such an embodiment, the resulting illumination pattern thus also has a randomly populated matrix of pixels stemming from the randomly populated matrix of the diffraction patterns.

As depicted, the diffraction pattern 30 is structured in the randomly populated matrix A having a number M of rows and a number N of columns such that the total number pixels (i.e. matrix elements) is given by the product of M and N. The randomly populated matrix A has pixels $A_{i,j}$, wherein i is the row number (1≤i≤M) and j is the column number (1≤j≤N). The randomly populated matrix A has illuminated pixels 72 and unilluminated pixels 74. More specifically, the illuminated pixels 72 has a light diffracted by the optical device 10 and the unilluminated pixels 76 does not.

In this embodiment, both the number M or rows and the number N of columns are odd numbers such that one pixel is at a central location 70 of the randomly populated matrix A. Accordingly, the central location 70 receives the zero order beam 34 such that diffraction pattern 30 is 'symmetrical' with respect to the central location 70, i.e. the state (illuminated or unilluminated) of the pixel $A_{i,j}$, corresponds to the state of the pixel $A_{M-i+1,N-j+1}$. For example, still referring to FIG. 6, the pixel $A_{1,1}$ is not illuminated correspondingly to the pixel $A_{9,9}$ while the pixel $A_{1,2}$ is illuminated similarly the pixel $A_{9,8}$ and so forth.

In some embodiments, it can be advantageous to design the beam splitter 12 and the pattern generator 14 to be abutted directly against one another. Indeed, by manufacturing the DOE of the beam splitter 12 on a given face 56 of a first substrate 58 and by manufacturing the DOE of the pattern generator 14 on a given face 56' of a second substrate 60, one may closely provide the given face 56 of the first substrate 58 directly in abutment with the given face 56' of the second substrate 60. Alternatively, a given distance 62 (shown in FIG. 1) may be provided between the beam splitter 12 and the pattern generator 14. Although it is preferred to provide the first substrate 58 of the beam splitter 12 and the second substrate 60 of the pattern generator 14 in a parallel manner, the two elements 58, 60 can be angled one relative to the other. Of course, such features can be considered during the design of the beam splitter 12 and the pattern generator 14.

In another embodiment, the beam splitter 12 and the pattern generator 14 can each be provided on opposite faces of a given substrate (not shown), for instance. Still in another embodiment, either one of the beam splitter 12 or the pattern generator 14 can be provided on more than one substrates (not shown), e.g. two substrates, three substrates, etc. Indeed, the beam splitter 12 or the pattern generator 14 may be etched on more than one substrate which would be optically coupled one to the others in the optical device 10.

Although only the first example, the second example and the third example of the illumination pattern 18 are shown in the figures, it is readily understood that other diffraction patterns 30, and other overlapping regions 42 can be provided with the optical device 10. An overlapping angle can be between 1° to 90°, preferably between 10° to 60°, and most preferably between 25° and 45°, for instance. Moreover, the overlapping angle may depend on the type of light beam generator 46 used and the wavelength of its light beam, for instance. Indeed, the illumination angle may depend on the wavelength of the light beam. Accordingly, the illumination angle may be 30° to 35° for visible light and 45° for infra-red (IR) light, for instance.

As can be understood, the examples described above and illustrated are intended to be exemplary only. It is understood that the light beam generator can provide monomode light (532 nm, 632 nm, 660 nm, 800-830 nm or any other suitable wavelength, for instance) or multimode light which may introduce different diffraction pattern designs. In some embodiments, the diffraction patterns will be identical to one another and can correspond to the entirety of the pattern of the pattern generator for instance, whereas in other embodiments, the diffraction patterns can be non-identical to one another, such as in cases where the DOE of the pattern generator is comprised of different regions each having a different pattern and each being effective on a different portion of the light beam having been separated from the other portions of the light beam by the beam splitter. The scope is indicated by the appended claims.

What is claimed is:

1. An optical device for generating an illumination pattern, the optical device comprising: a beam splitter and a pattern generator mounted in series and optically coupled one with the other, the beam splitter and the pattern generator configured to cooperate one with the other in formatting an incident light beam into the illumination pattern, the illumination pattern having a plurality of diffraction patterns each resulting from a corresponding splitting of the incident light beam by the beam splitter, each diffraction pattern having a zero-order beam, the zero-order beams being separated from one another in the illumination pattern, and wherein at least a first one of the diffraction patterns overlaps with at least a second one of the diffraction patterns, forming at least one overlapping region which contains the zero-order beams of the first one and of the second one of the diffraction patterns.

2. The optical device of claim 1, wherein the pattern generator is a random pattern generator which generates a diffraction pattern in the form of a randomly populated matrix of pixels, and the illumination pattern also has a randomly populated matrix of pixels stemming from the randomly populated matrix of the plurality of diffraction patterns.

3. The optical device of claim 1, wherein the plurality of zero order beams are comprised within a common one of the overlapping regions.

4. The optical device of claim 1 wherein the plurality of zero order beams are not comprised within a common one of the overlapping regions.

5. The optical device of claim 1, wherein each of the beam splitter and the pattern generator is a diffractive optical element etched on a given face of an optically transparent substrate.

6. The optical device of claim 5, wherein the given face of the optically transparent substrate of the beam splitter is abutted to the given face of the optically transparent substrate of the pattern generator.

7. The optical device of claim 1 wherein the diffraction patterns include active regions and inactive regions.

8. The optical device of claim 7 wherein the diffraction patterns are arranged with respect to one another in the illumination pattern in a manner that each of the active regions does not overlap with the other active regions and that the active regions collectively cover the entire area of the illumination pattern.

9. The optical device of claim 7 wherein the diffraction patterns have a rectangular shape and each include four rectangular active regions located at four corners of the corresponding rectangular shape, the active regions having a given width and a given height, wherein laterally adjacent ones of the diffraction patterns are offset from one another by a distance corresponding to the given width and vertically adjacent ones of the diffraction patterns are offset from one another by a distance corresponding to the given height in a manner that the illumination pattern is formed of a tessellation of the active regions.

10. The optical device of claim 1, wherein the diffraction patterns are identical to one another and arranged with respect to a central location of the zero order beam such that $A_{i,j} = A_{M-i+1, N-j+1}$.

11. An optical system for interrogating a volume with an illumination pattern, the optical system comprising:
   a housing;
   a light beam generator mounted on the housing for generating a light beam along an optical path thereof;
   a beam splitter and a pattern generator mounted in series and optically coupled one with the other, the beam splitter and the pattern generator configured to cooperate one with the other in formatting an incident light beam into an illumination pattern, the illumination pattern comprising a plurality of diffraction patterns each resulting from a corresponding splitting of the incident light beam by the beam splitter, each diffraction pattern having a zero-order beam, the zero-order beams being separated from one another in the illumination pattern, and wherein at least a first one of the diffraction patterns overlaps with at least a second one of the diffraction patterns, forming at least one overlapping region which contains the zero-order beams of the first one and of the second one of the diffraction patterns;
   an illumination pattern sensor mounted to the frame and configured to sense the illumination pattern on the volume; and
   a processor in communication with the illumination pattern sensor and configured to process the detected illumination pattern to obtain a mapping of the volume.

12. The optical system of claim 11, wherein the pattern generator is a random pattern generator which generates a diffraction pattern in the form of a randomly populated matrix of pixels, and the illumination pattern also has a randomly populated matrix of pixels stemming from the randomly populated matrix of the plurality of diffraction patterns.

13. The optical system of claim 11, wherein the plurality of zero order beams are comprised within a common one of the overlapping regions.

14. The optical system of claim 11, wherein the diffraction patterns are identical to one another and arranged with respect to a central location of the zero order beam such that $A_{i,j} = A_{M-i+1, N-j+1}$.

15. The optical system of claim 11, wherein the diffraction patterns include active regions and inactive regions.

16. The optical system of claim 15, wherein the diffraction patterns are identical to one another and arranged with respect to one another in the illumination pattern in a manner that each of the active regions does not overlap with the other active regions and that the active regions collectively cover the entire area of the illumination pattern.

17. The optical system of claim 15, wherein the diffraction patterns have a rectangular shape and each include four rectangular active regions located at four corners of the corresponding rectangular shape, the active regions having a given width and a given height, wherein laterally adjacent ones of the diffraction patterns are offset from one another by a distance corresponding to the given width and vertically adjacent ones of the diffraction patterns are offset from one another by a distance corresponding to the given height in a manner that the illumination pattern is formed of a tessellation of the active regions.

18. A method for interrogating a volume with an illumination pattern, the method comprising the steps of:
   providing an incident light beam along an optical path;
   splitting the incident light beam along the optical path to obtain a plurality of partial light beams;
   imparting a diffraction pattern to each one of the partial light beams to form an illumination pattern comprising a plurality of diffraction patterns each having one of a plurality of zero-order beams, the zero-order beams being separated from one another in the illumination pattern;
   orienting a first one of the diffraction patterns to overlap with at least a second one of the diffraction patterns forming at least one overlapping region which contains the zero-order beams of the first one and of the second one of the diffraction patterns; and
   interrogating the volume with the illumination pattern.

19. The method of claim 18, wherein said orienting further comprises orienting the plurality of zero order beams within a common overlapping region.

20. The method of claim 18, wherein said orienting further comprises arranging the diffraction patterns with respect to one another in the illumination pattern in a manner that each of the active regions does not overlap with the other active regions and that the active regions collectively cover the entire area of the illumination pattern.

21. An optical device for generating an illumination pattern, the optical device comprising: a beam splitter and a pattern generator mounted in series and optically coupled one with the other, the beam splitter and the pattern generator configured to cooperate one with the other in formatting an incident light beam into the illumination pattern, the illumination pattern having a plurality of diffraction patterns each resulting from a corresponding portion of the incident light beam being split from other portions of the incident light beam by the beam splitter, each diffraction pattern having a zero-order beam, each diffraction pattern overlapping with at least one of the other diffraction patterns and forming at least one overlapping region therewith, wherein the plurality of zero-order beams of the plurality of diffraction patterns are separated from one another in the illumination pattern and wherein the plurality of zero order beams are comprised within a common one of the overlapping regions.

* * * * *